(12) United States Patent
Lin

(10) Patent No.: US 7,433,388 B2
(45) Date of Patent: Oct. 7, 2008

(54) RECEIVER NOISE ESTIMATION

(75) Inventor: Yu-Chuan Lin, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/285,852

(22) Filed: Nov. 22, 2005

(65) Prior Publication Data
US 2006/0072655 A1 Apr. 6, 2006

Related U.S. Application Data

(63) Continuation of application No. 10/062,155, filed on Jan. 30, 2002, now Pat. No. 7,010,017.

(51) Int. Cl.
*H04B 1/707* (2006.01)
(52) U.S. Cl. .................. 375/148; 375/147; 375/349
(58) Field of Classification Search ............... 375/147, 375/227, 144, 148, 349, 347; 324/613; 327/310; 329/318, 320; 455/501; 370/320, 335, 342, 370/441, 479
See application file for complete search history.

(56) References Cited

U.S. PATENT DOCUMENTS

| | | | | | |
|---|---|---|---|---|---|
| 4,179,658 | A | * | 12/1979 | Bitzer | ............... 375/142 |
| 5,506,865 | A | | 4/1996 | Weaver, Jr. | |
| 5,559,790 | A | | 9/1996 | Yano et al. | |
| 5,754,533 | A | | 5/1998 | Bender et al. | |
| 5,764,687 | A | | 6/1998 | Easton | |
| 5,768,307 | A | * | 6/1998 | Schramm et al. | ............. 375/150 |
| 6,134,215 | A | * | 10/2000 | Agrawal et al. | ............. 370/209 |
| 6,477,208 | B1 | * | 11/2002 | Huff | ............... 375/265 |
| 6,546,237 | B1 | * | 4/2003 | Glas | ............... 455/324 |
| 6,693,979 | B1 | * | 2/2004 | Kumar | ............... 375/326 |
| 6,728,301 | B1 | * | 4/2004 | Chrisikos | ............. 375/147 |
| 2001/0015998 | A1 | * | 8/2001 | Lomp et al. | ............. 375/147 |

(Continued)

FOREIGN PATENT DOCUMENTS

| | | |
|---|---|---|
| WO | 9966643 | 12/1999 |
| WO | 0122623 | 3/2001 |

OTHER PUBLICATIONS

Definition: Cross Product, Wikipedia found Feb. 28, 2006 at http://en.wikipedia.org/wiki/Cross_product.*
International Search Report ISA EPO PCT/US03/02733 May 22, 2003.

(Continued)

*Primary Examiner*—Betsy L Deppe
(74) *Attorney, Agent, or Firm*—George C. Pappas; Alan Gordon; Thomas R. Rouse

(57) ABSTRACT

A power estimator for a Code Division Multiple Access (CDMA) receiver. A noise estimate of a received channel may be made by demodulating a received signal using an empty code or Walsh channel. The noise estimate may also be made by demodulating the Pilot signal in systems where potentially all Walsh codes are assigned to active channels. Where the channels are quadrature phase modulated, the noise estimator may take advantage of the Pilot channel configuration by demodulating only the quadrature element of the Pilot channel. The noise estimator demodulates the Pilot using signal processing stages that statistically correspond to the signal processing performed on traffic channels. The statistics of the processing performed in the noise estimate closely track the statistics of the signal processing performed on the traffic channels.

45 Claims, 10 Drawing Sheets

U.S. PATENT DOCUMENTS

| | | | |
|---|---|---|---|
| 2002/0101832 A1* | 8/2002 | Chen et al. | 370/318 |
| 2002/0105375 A1* | 8/2002 | Sorokine | 329/345 |
| 2002/0168955 A1* | 11/2002 | Wildhagen | 455/277.1 |
| 2003/0031232 A1* | 2/2003 | Shi et al. | 375/141 |
| 2003/0103004 A1* | 6/2003 | Arndt et al. | 342/465 |
| 2003/0103556 A1* | 6/2003 | Han | 375/148 |

* cited by examiner

RECEIVER NOISE ESTIMATION

CROSS REFERENCE

This application is a continuation of U.S. application Ser. No. 10/062,155, filed on Jan. 30, 2002 now U.S. Pat. No. 7,010,017, entitled "Receiver Noise Estimation," and currently assigned to the assignee of the present application.

BACKGROUND OF THE INVENTION

1. Field of the Invention

The invention relates to digital communications. More particularly, the invention relates to noise estimation in a communication receiver.

2. Description of the Related Art

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems. For example, a CDMA system provides increased system capacity.

A CDMA system may be designed to support one or more CDMA standards such as (1) the Telecommunications Industry Association (TIA)/Electronic Industries Association (EIA) "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

A communication system 100 is shown in FIG. 1 as a CDMA wireless phone system. The communication system 100 has one or more base stations, 110a and 110b, here shown as antenna systems typical of a wireless phone system. Although only two base stations 110a, 110b are shown, it is understood that the communication system 100 may support any number of base stations. Each base station 110a, 110b provides coverage for a corresponding cell 120a, 120b. The coverage areas or cells 120a, 120b supported by the two base stations 110a, 110b are shown to be overlapping. However, it is understood that where more than one base station is supported in the communication system 100, the cells supported by each base station may or may not overlap. Additionally, the cells of any three or more base stations may have some common coverage areas or may be mutually exclusive.

Since the operation of the communication system 100 within each cell is substantially identical, the discussion will focus on the operation within a single cell. A base station 110a supports coverage over a corresponding cell 120a. There may be one or more Mobile Stations (MS) 130a, 130b, within the cell 120a simultaneously communicating with the base station 110a. The MS 130a, 130b are shown as portable phones but it is understood that the MS 130a, 130b may be portable phones, mobile phones operating within vehicles, fixed position phones, wireless local loop phones, or any other type of communication device. The base station 110a communicates to each MS 130a, 130b, over a forward link channel and each MS 130a, 130b communicates to the base station 110a over a reverse link channel. The communication links may be over a continuously active channel or may allow for DTX. The base station 110a also communicates with a Base Station Controller (BSC) 150 that provides the communication link to a Public Switched Telephone Network (PSTN) not shown.

The CDMA standards provide specific details concerning the generation of the various channels supported on each of the forward and reverse links. Typical generation of a forward traffic channel and a forward pilot channel are shown, respectively, in the functional block diagrams of FIG. 2 and FIG. 3.

Forward traffic channel generation is shown in the functional block diagram of FIG. 2. The figure shows a generalized functional depiction of Forward Traffic channel generation. Forward channels may not all be generated identically with the block diagram shown in FIG. 2. Data to be transmitted on the forward traffic channel is coupled to a convolutional encoder 204. The convolutional encoder 204 is used to provide Forward Error Correction (FEC). The constraint length and rate of the convolutional encoder 204 may vary according to the particular standard and configuration of the communication system. Alternatively, a turbo encoder may substitute for the convolutional encoder 204 in system that provide for turbo encoding.

The output of the encoder 204, whether convolutional or turbo, is coupled to an interleaver 208. The forward link signal is interleaved at the BS in order to lessen the effects of a burst of errors that may be caused, for example, by a fast signal fade due to destructively combining multipaths at a receiver front end. Interleaving the symbols before transmission and deinterleaving after reception causes bursts of errors to be spread out in time and to appear to the decoder as if they were random errors. Interleaving is typically performed on a frame basis when block interleaving is performed. The output of the interleaver 208 is coupled to a first input of a first modulo two adder 210.

A long PN code generator 230 generates a pseudo random noise sequence based on a pseudo noise sequence masked in part by an electronic serial number of the specific MS for which the data is intended. The unique output from the long PN code generator 230 is coupled to a first decimator 232 used to reduce the rate of the signal from the long PN code generator 230 to coincide with the symbol rate output from the interleaver 208. The output of the first decimator 232 is coupled to a second input of the first modulo two adder 210. The output of the first modulo two adder 210 represents the interleaved data scrambled by the PN sequence. The scrambled output of the first modulo two adder 210 is then coupled to a first input of a multiplexer (MUX) 220.

A single bit output from a Power Control section 224 is provided as a second input to the MUX 220. The power control bit is punctured onto the scrambled data symbols and is used within a closed power control to instruct the MS to increase or decrease its transmit power. The location of the punctured bit is pseudo randomly determined using the long PN sequence.

The pseudo random sequence output from the first decimator 232 is coupled to an input of a second decimator 234. The second decimator 234 further reduces the rate of the PN sequence to a desired power control puncture rate. The PN sequence output from the second decimator 234 is coupled to a control input of the MUX 220. Thus, the PN sequence provided at the control input to the MUX 220 directs the MUX 220 to puncture the power control bit into the scrambled data symbols in a pseudo random location.

The output of the MUX 220 is coupled to an input of a second modulo two adder 240 used in the direct spreading of the data symbols. A Walsh code generator 242 provides a single Walsh code sequence, that is assigned to the particular Traffic Channel, to a second input of the second modulo two adder 240. The second modulo two adder 240 directly spreads each input symbol with the provided Walsh code. If the Walsh code length is sixty-four, the second modulo two adder 240 outputs a sequence of sixty four chips for each input symbol. The output from the second modulo two adder 240 is the modulo two sum of the Walsh code with the symbol and thus, sixty four chips are outputted in the time span of a single symbol.

The spread output from the second modulo two adder 240 is provided to two parallel paths that are used to generate the in phase (I) and quadrature (Q) signal components. Alternatively, as in some radio configurations of CDMA 2000, the symbols may be Quadrature Phase Shift Keyed and separate in phase and quadrature symbols may be provided to corresponding I and Q signal paths. The output of the second modulo two adder 240 is coupled to an in phase adder 252. The name of the adder denotes the function of adding the signals in the in phase path and does not denote functionality with respect to any specific phase of the signal. An Offset I PN generator 262 is coupled to a second input of the in phase adder 252. The output of the in phase adder 252 represents the in phase data signal and is coupled to a filter (not shown) and a modulator (not shown) for generation of the in phase (I) modulated signal.

Similarly, the output of the second modulo two adder 240 is coupled to an input of a quadrature adder 254. An Offset Q PN generator 264 is coupled to a second input of the quadrature adder 254. The output of the quadrature adder 254 represents the quadrature data signal and is coupled to a filter (not shown) and quadrature modulator (not shown) for generation of the quadrature (Q) modulated signal.

The Offset I and Q PN generators, 262 and 264, are short PN sequences used to isolate one cell or sector from another. The offset enables reuse of the Walsh codes in every sector.

The Pilot Channel can be viewed as a special case of Traffic Channel generation. The Pilot Channel is used to provide a receiver with time, phase, and signal strength information. It is not intended to carry user data. Typical Pilot Channel generation is shown in FIG. 3.

Referring to FIG. 3, all zeros are provided as the input to the Pilot Channel Generator 300. The Pilot Channel carries no information on it. The all zeros input is coupled to a first input of a modulo two adder 310. A Walsh code generator 320 is coupled to a second input of the modulo two adder 310. The modulo two adder 310 normally operates to spread the input signal by the Walsh code. However, the Walsh code used for the Pilot Channel is the zero Walsh code. Thus, the output of the modulo two adder 310 still represents all zeros. The symbols used in the Pilot Channel are Bi-Phase Shift Keyed unlike the alternatives available for forward traffic generation. Only an in phase (I) signal component is represented by all zeros. There is no Q signal component. Thus, the same symbols are routed to both the I and Q signal paths for generation of the QPSK chips. This signal is coupled to a first input of an in phase adder 352. An Offset I PN generator 362 is coupled to a second input on the in phase adder 352. The output of the in phase adder 352 represents the I Pilot data that, when modulated, represents the I Pilot signal.

The output of the modulo two adder 310 is also coupled to a first input of a quadrature adder 354. An Offset Q PN generator 364 is coupled to a second input of the quadrature adder 354. The output of the quadrature adder 354 represents the Q Pilot data that, when modulated, represents the Q Pilot signal.

The Offset I and Q generators, 352 and 354, are the same short PN sequences used in the forward traffic generation and are used to isolate one sector from another. A receiver may recover the short PN offset used in Traffic Channel generation by recovering the short PN offset from the Pilot Channel.

The differences in Traffic Channel and Pilot Channel generation allow a receiver to implement different configurations for extracting the desired information from the respective channels. In addition to extracting information contained in each channel, the receiver may also generate signal metrics in order to assist in closed loop power control. A typical metric used by a receiver in closed loop power control is energy per bit to noise power ratio ($E_b/N_t$). The receiver measures or estimates an energy per bit value as well as a noise power value in order to calculate the ratio. A signal energy value may be calculated as part of the signal demodulation processing. However, the implementation of a noise power estimator may take various configurations. When the receiver is implemented as a rake receiver having a plurality of fingers, demodulated signals are coherently combined from each of the fingers. A noise power estimate needs to take into account the statistics of the processing of the received signals. Ideally, the statistics of the noise estimate processing track the statistics of the received signal processing. When the statistics of the noise estimate processing do not track those of the signal processing erroneous signal metrics may result. What is needed is a noise power estimation implementation that provides an accurate measurement of the received noise power over all receiver operating conditions.

SUMMARY OF THE INVENTION

Novel techniques for noise power estimation in a Code Division Multiple Access (CDMA) receiver are disclosed. A noise estimate of a received channel may be made by demodulating a received signal using an empty code or Walsh channel. The noise estimate may also be made by demodulating the Pilot signal in systems where potentially all Walsh codes are assigned to active channels. Where the channels are quadrature phase modulated, and a signal is comprised of an in phase symbol component and no quadrature symbol component, the noise estimator may take advantage of the Pilot channel configuration by demodulating only the quadrature component of the Pilot channel. The noise estimator demodulates the Pilot using signal processing stages that statistically track the signal processing performed on traffic channels. The statistics of the processing performed in the noise estimate closely track the statistics of the signal processing performed on the traffic channels.

The receiver may be implemented on the Forward Link or the Reverse Link of a communication system. The method and apparatus for noise power estimation may be implemented in a mobile station, base station, or base station controller. Where the receiver calculates a signal magnitude as part of a signal metric, the noise estimator may be configured to calculate a noise magnitude. Where the receiver calculates a signal energy as part of a signal metric, the noise estimator may be configured to calculate a noise energy.

A method of noise estimation may include demodulating a received signal on an empty code channel and calculating a noise estimate from the resulting demodulated signal. A method of noise estimation may also include calculating a cross product of a received Pilot signal to generate a demodulated Pilot signal, then calculating an energy of the demodulated signal and accumulating the calculated energy over a frame. When a receiver is implemented as a rake receiver, the noise estimation method may include calculating a cross product of a received Pilot signal in a plurality of fingers of the rake receiver in order to generate demodulated Pilot signals in each of the plurality of fingers. The method also includes time aligning the demodulated signals from each of the fingers in corresponding plurality of deskew buffers, then summing the time aligned demodulated signals from the deskew buffers to generate a composite demodulated signal.

A communication device having a noise estimator may include means for demodulating a received signal on an empty code channel and means for calculating a noise estimate from the demodulated signal. Another embodiment of a noise estimator may include means for calculating a cross product of a received Pilot signal in a plurality of fingers of a rake receiver to generate a demodulated Pilot signal in each of the fingers. The noise estimator also includes means for time aligning the demodulated signals in corresponding deskew buffers and means for summing the time aligned demodulated signals from the plurality of deskew buffers to generate a composite demodulated signal. Another embodiment of a noise estimator may include a receiver adapted to demodulate a received signal using an empty Walsh code and a noise calculator adapted to generate an output comprising a noise estimate. The noise estimator also includes an accumulator adapted to sum the output of the noise calculator over a predetermined period of time, such as a frame.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF EMBODIMENTS

A receiver implementation may make implementation of a particular noise power estimator a preferable choice because only minimal design changes will need to be implemented and the processing capabilities of the receiver will not be heavily burdened by the noise power estimator. The noise power estimator described below takes into account the receiver structure in order to ease implementation of the noise power estimator. Additionally, the noise power estimator takes into account the operating conditions of the receiver such that an accurate noise power estimate is made for all conditions.

Figure 1:
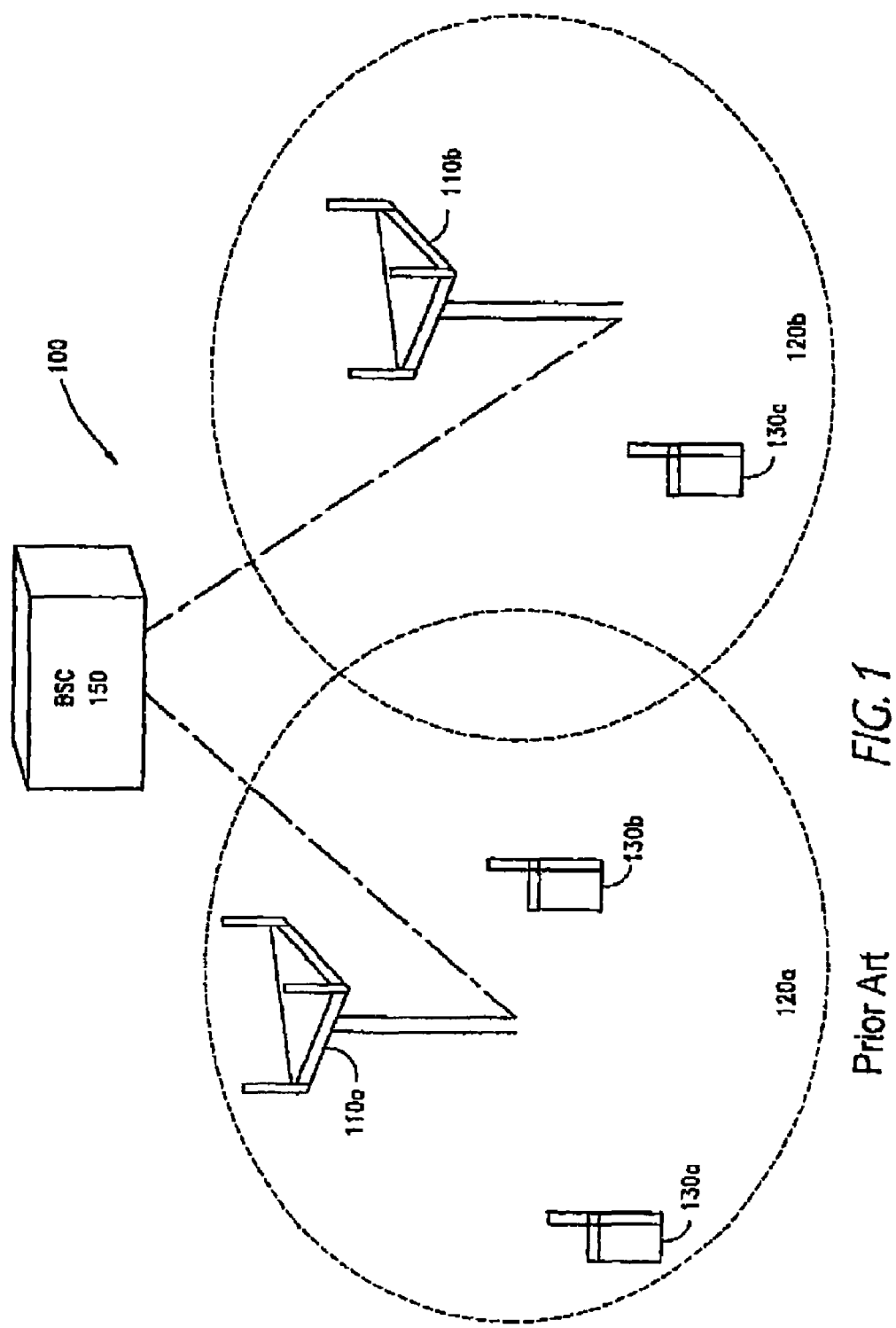
FIG. 1 is a functional diagram of a CDMA wireless communication system.
Figure 2:
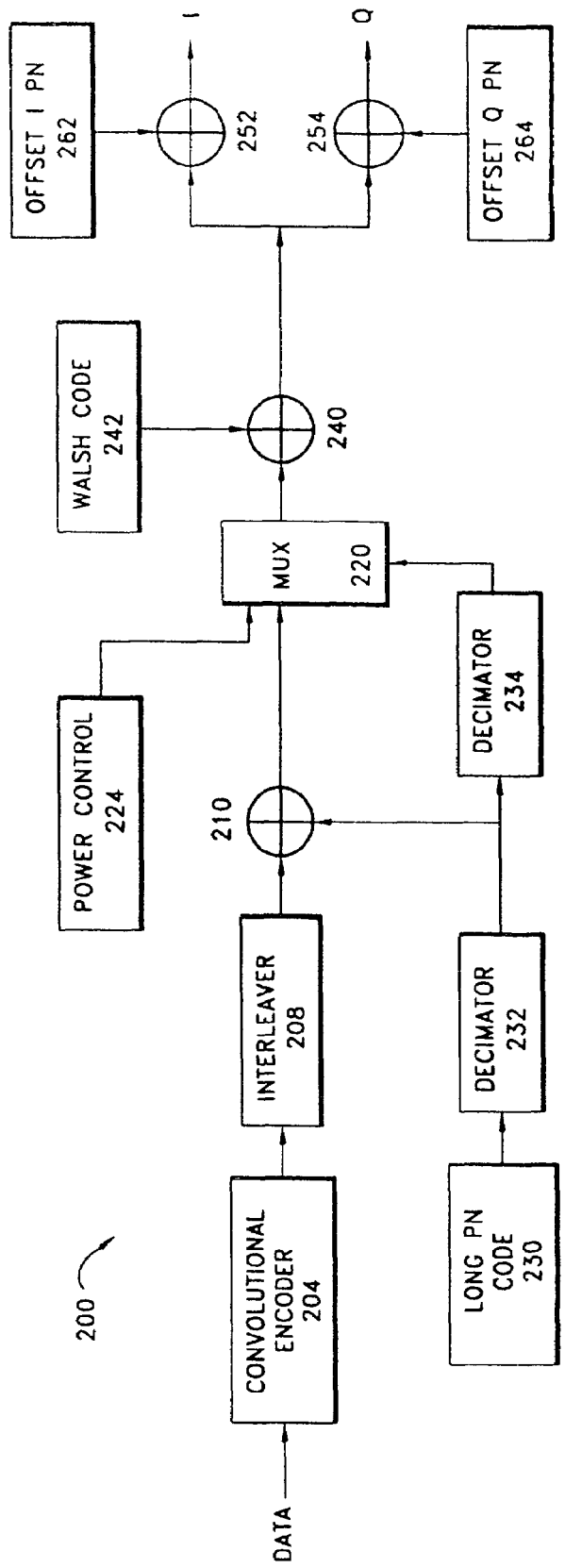
FIG. 2 is a block diagram of Forward Traffic Channel generation.
Figure 3:
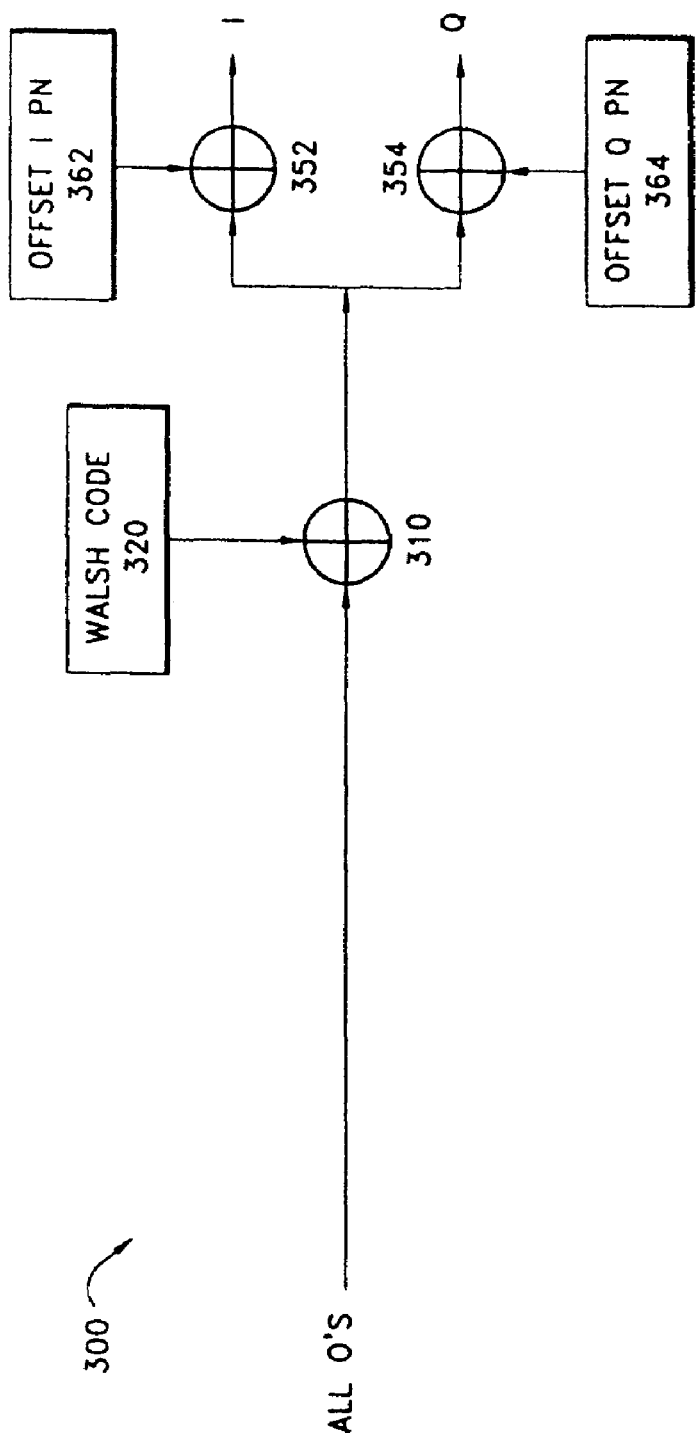
FIG. 3 is a block diagram of Forward Pilot Channel generation.
Figure 4:
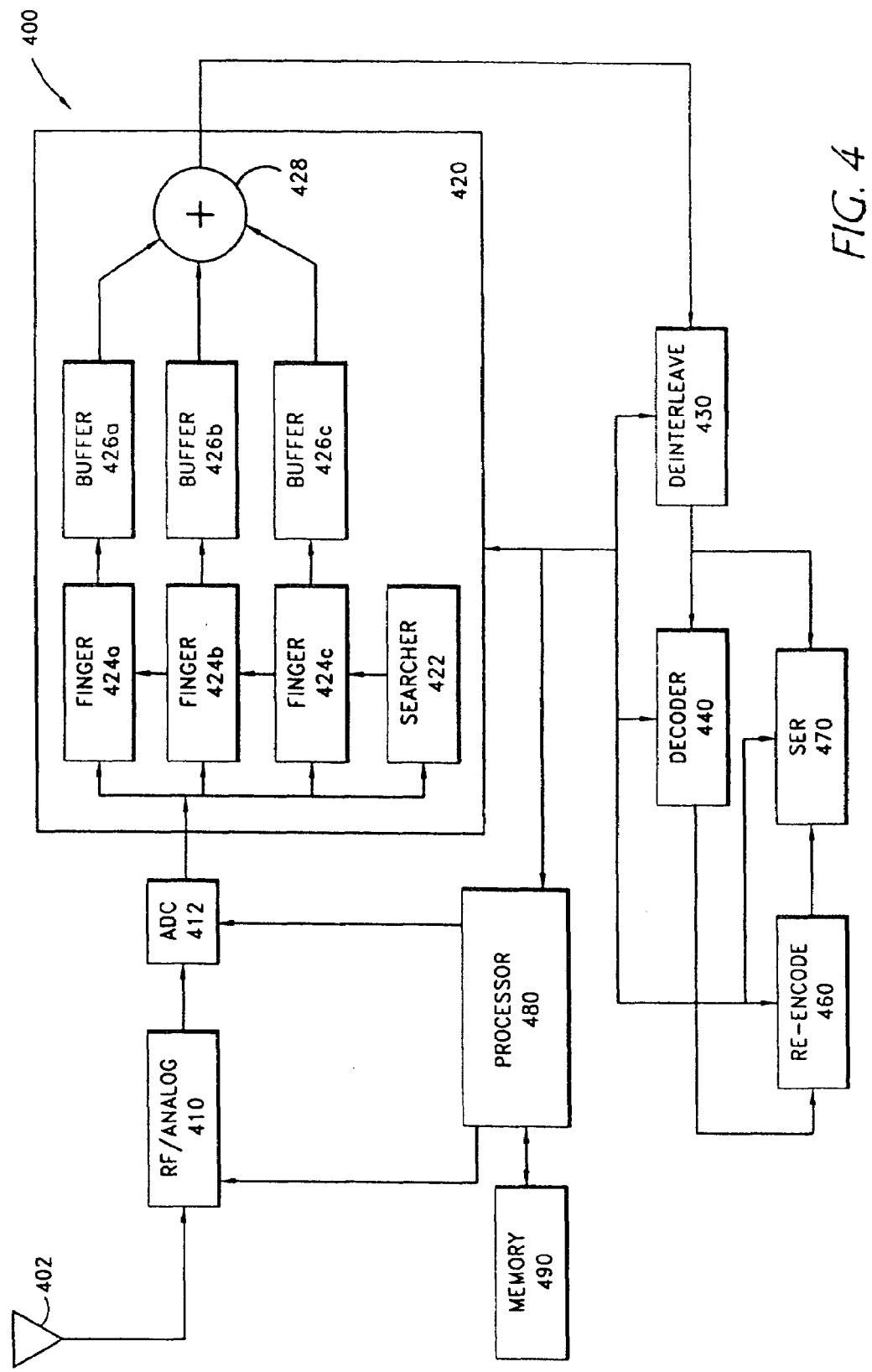
FIG. 4 is a block diagram of a CDMA receiver.

FIG. 4 shows a functional block diagram of a CDMA receiver 400 implementing a noise power estimator. The receiver 400 may represent one half of a transceiver such as may be used in a wireless phone operating in a system that is compliant with the CDMA 2000 standard. Alternatively, all or portions of the receiver 400 may be implemented in a Base Station (BS) or Base Station Controller (BSC). A data signal that is modulated at a BS in accordance with the forward link signal standards is transmitted to the receiver 400. An antenna 402 at the front end of the receiver 400 interfaces the receiver 400 to the wireless communication link. The received signal at the output of the antenna 402 is coupled to a Radio Frequency (RF)/analog section 410. The RF/analog section 410 is used to tune the receiver 400 to a specific assigned frequency band, downconvert the received signal to a lower frequency signal, filter the signal, and amplify the signal. The output of the RF/analog section 410 is an analog signal that is at a low Intermediate Frequency (IF) or at baseband. The processed analog signal is then coupled to an Analog to Digital Converter (ADC) 412 where the signal is sampled and converted to a digital representation. The digitized output of the ADC 412 is coupled to a rake receiver 420.

The rake receiver 420 gets its name from its internal structure. Within the rake receiver 420 there are multiple fingers 424a-424c that track different copies of the desired signal. The different path lengths used by the signal when it traverses from the BS to the receiver 400 produce multiple copies of the desired signal. The differing multipaths produce replicas of the desired signal that are slightly offset in time from one another. The rake receiver 420 capitalizes on the ability of a CDMA system to differentiate between small time differences of received signals by assigning each finger 424a-424c of the rake receiver 420 to a different time delayed copy of the desired signal. A searcher 422 is used to constantly search the digitized signal for strong signal paths. The searcher 422 may assign a signal from a particular signal path to a particular finger 424a-424c depending on the signal strength from that particular signal path. The path assignments are continually updated as the received signal changes. Thus, each finger 424a-424c is assigned a time offset copy of the same signal that is assigned to the other fingers. Although only three fingers 424a-424c are shown in the rake receiver 420, the actual number of fingers may vary according to the desires and design constraints of the receiver designer.

Ideally, each finger 424a-424c is assigned to a multipath signal that is not correlated to any other multipath signal assigned to any other finger 424a-424c. However, there are conditions where the multipath signals assigned to separate fingers 424a-424c will be correlated. One condition where multipath signals assigned to two different fingers 424a-424b may correlate is where the multipath signals merge due to changes in the multipaths. A first finger 424a may be assigned to a first multipath signal that corresponds to a first path length from a transmitter to the receiver 400. A second finger 424b may be assigned to a second initially uncorrelated multipath signal that corresponds to a second path length from the transmitter to the receiver 400. Each of the fingers 424a-424b continues to track the respective multipath signals until the searcher 422 changes the finger assignment. However, as the receiver 400 moves its location or antenna 402 orientation, the multiple path lengths change along with the corresponding multipath signals. It is conceivable that the path length, and thus multipath signal, tracked by the first finger 424a may at some point merge with the path length and corresponding multipath signal tracked by the second finger 424b. The fingers 424a-424b are no longer uncorrelated when the first and second path lengths produce a signal time offset that is smaller than a minimum discernable time offset. A noise estimator that uses signals from the fingers 424a-424c should account for the possibility of correlated signals. When the signals in the fingers 424a-424c are correlated, the noise is also correlated.

A noise power estimator may be implemented into the receiver 400, as described further below, for estimating the received noise using the received Pilot Channel that is present in Forward Link signals, and that may be present in some implementations of the Reverse Link. The noise power estimator uses the rake receiver 420 to demodulate the Pilot signal as if it were a Traffic Channel. The demodulated signal represents noise because the Pilot is not modulated with data. Demodulating the Pilot Channel as if it were a Traffic Channel allows the noise estimator to account for the possibility of correlated noise signals in multiple fingers 424a-424c.

Each finger 424a-424c determines the time offset between its assigned signal and a time reference. The finger 424a-424c makes the time alignment determination by correlating its assigned multipath signal to a time reference signal. The correlation also is used to despread the signal assigned to the finger 424a-424c. After making the time alignment determination, the finger 424a-424c writes the despread signal values to a corresponding buffer 426a-426c. The despread signal values written into the corresponding buffers 426a-426c represent time aligned versions of the same desired signal. Thus, the time aligned contents of the buffers 426a-426c may be coherently combined in a summer 428. Because noise is generally not correlated over the various time alignments assigned to the fingers 424a-424c, the noise does not coherently combine in the summer 428. Thus, the rake receiver 420 increases the desired signal to noise ratio by time aligning and coherently summing the time offset versions of the desired signals that are produced by multipath. The output of the rake receiver thus represents an aligned signal.

The coherently combined output from the rake receiver 420, representing the aligned signal, is coupled to a deinterleaver 430. The deinterleaver 430 performs block deinterleaving on the received symbols to rearrange the symbols to the order they were in prior to interleaving at the BS. The deinterleaved symbols are then coupled to the input of a decoder 440.

The symbols are decoded in a manner consistent with the encoding process used in the BS. As noted earlier, the different channels on the forward link may use different types of Forward Error Correction (FEC). Some channels, like the F-SCH, may use different types of FEC depending on the particular radio configuration. Symbols on F-SCH may be convolutionally encoded or turbo encoded depending on the supported radio configuration.

The receiver 400 implements a convolutional decoder, such as a Viterbi decoder, as the decoder 440 when the symbols are convolutionally encoded and the receiver 400 implements a turbo decoder as the decoder 440 when the symbols are turbo encoded. The decoded bits that are output from the decoder 440 may also include other signal quality indicators such as parity bits or Cyclic Redundancy Check (CRC) bits.

The output of the decoder 440 is coupled to a Re-encoder 460. The decoding process may be much more computationally intensive than the encoding process. This is because the decoder makes decisions as to the probability of each bit while the encoder entails a fairly straightforward computation. Therefore, re-encoding the decoded bits and comparing the re-encoded symbols to the received symbols may be used to generate an error metric. The decoded bits that are output from the decoder 440 are re-encoded using the same FEC algorithm used in the BS. Thus, the Re-encoder 460 performs convolutional encoding if the decoder 440 performed Viterbi decoding and the Re-encoder 460 performs turbo encoding if the decoder 440 performed turbo decoding.

The Re-encoder 460 provides the re-encoded data to a Symbol Error Rate (SER) check detector 470. The SER detector 470 receives the re-encoded symbols from the re-encoder 460 and an estimate of the received symbol data at the input to the decoder 440. The SER detector 470 compares the re-encoded symbols to the estimate of the received symbol data and counts the number of discrepancies between the re-encoded symbol data and the received symbol data. In addition to any CRC bits, the SER values help provide a determination of whether the frame has errors.

The output of the decoder 440 may also be provided to a user interface (not shown), another signal processing stage (not shown), or to another functional block within the receiver 400 or a transceiver (not shown) for which the receiver 400 is a part. The additional decoder 440 output routing possibilities are not shown for purposes of clarity.

A processor 480 coupled to memory 490 may be used to provide processing power or control for various blocks within the receiver 400. The processor 480 may control the analog gain of various amplifier stages in the RF/analog stage 410 as part of an Automatic Gain Control (AGC) loop. The processor 480 may generate Walsh codes or timing references used in the rake receiver 420 or may be used to provide the coherent summing function 428. The interconnections of the processor 480 to the various stages and the corresponding functions of the interconnections are provided only as examples and are not intended to be an exhaustive list of the interconnections or functions of the processor 480.

The receiver also determines closed loop power control metrics in addition to recovering the desired signal. As noted above, a typical metric used by a receiver in closed loop power control is energy per bit to noise power ratio ($E_b/N_t$). The receiver may calculate or estimate a received energy or magnitude as the numerator of the ratio.

Figure 5:
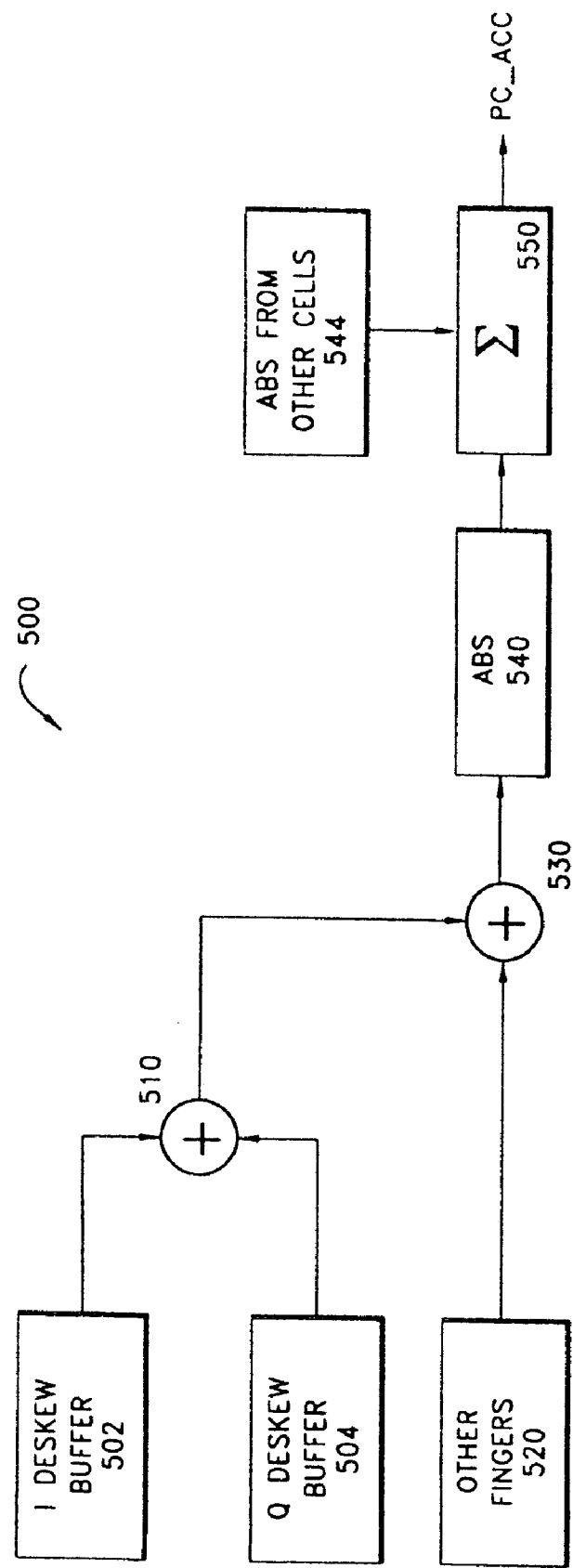
FIG. 5 is a block diagram of Signal Energy Estimator.

FIG. 5 shows a functional block diagram of a signal energy estimator 500. The estimator 500 determines an energy of a Traffic channel by calculating a magnitude based on the power control bits punctured into the data in the Traffic Channel generation process. It may be convenient to use the punctured power control bits because they are not affected by frame rate changes. The punctured power control bits have an energy that is greater than an energy of a full rate traffic bit because of the way that the power control bits are defined in the CDMA standards. One power control bit is punctured into the signal every Power Control Group (PCG). The signals are despread and aligned in the rake receiver. The aligned signals are stored in deskew buffers to allow coherent combining from multiple fingers. Thus, for a single finger, an I deskew buffer 502 and a Q deskew buffer 504 are used to hold the time aligned symbols. An output of the I deskew buffer 502 is coupled to a first input of a first summer 510. An output of a Q deskew buffer 504 from the same finger is coupled to a second input of the first summer 510. The data from the deskew buffers, 502 and 504, are gated such that only the aligned power control bits are provided to the first summer 510. A controller (not shown) that is able to determine the position of the power control bits can be used to strobe the power control bits out of the deskew buffers, 502 and 504, to the first summer 510. The power control bits output from the I and Q deskew buffers, 502 and 504, should represent the same bit, such that the sum will reinforce the value. The output of the first summer 510 is coupled to a first input of a second summer 530. Similarly summed I and Q power control bits from other fingers 520 are already time aligned with the power control bit output from the first summer 510. In this instance, the other fingers track signals from the same cell that the first finger tracked. The respective outputs from the summers of other fingers are also coupled to inputs on the second summer 530. Although only a single line is shown connecting the summed power control bits from the other fingers 520 to the second summer 530, it is understood that the number of signals summed may equal a number of fingers. Where the rake receiver implements three fingers as shown in the embodiment of FIG. 4, the summed power control bits from two other fingers could be coupled to the second summer 530. A controller (not shown) coupled to each finger deskew buffer may further qualify the output from the buffer. The controller may exclude the outputs from fingers where the signal tracked by the finger is not sufficiently strong enough to have a high confidence in the power control bit value.

The output of the second summer 530 is a coherent sum of the power control bits from each of the fingers. The output of the second summer 530 is coupled to an absolute value generator 540 where a magnitude of the sum is calculated. The output of the absolute value generator 540 is coupled to an input of an accumulator 550. The magnitude of a summed power control bit from other cells is calculated in another cell absolute value generator 544 if there are any fingers tracking signals directed to the receiver that originate from other cells. The number of absolute value generators could equal the number of fingers to correspond with the situation where each finger in the rake receiver is tracking a signal from a different cell. The outputs from the other cell absolute value generators 544 are also coupled to inputs on the accumulator 550. The other cell absolute value generators do not contribute when the fingers do not track signals from other cells.

The accumulator 550 sums all of the input values over a period of time. It is convenient to use the time span of a single frame when the receiver is a CDMA receiver. There are sixteen power control groups within a single frame. Thus, the accumulator 550 sums the outputs from the absolute value generators, 540 and 544, over sixteen calculations. The output of the accumulator 550 represents an accumulated power control bit magnitude.

Figure 6:
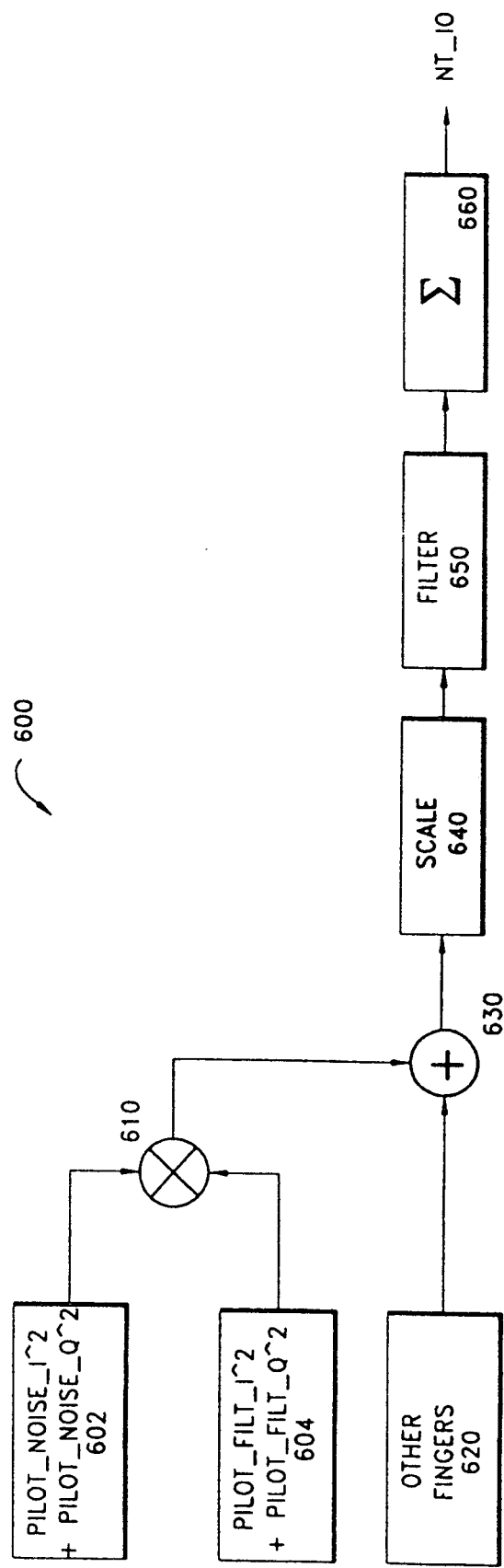
FIG. 6 is a block diagram of a Noise Power Estimator.

The power control metric energy per bit to noise power ratio ($E_b/N_t$) also requires a measurement or estimate of a noise power. FIG. 6 shows a functional block diagram of a noise power estimator 600. In a first finger, an initial finger noise estimate 602 is made using the despread Pilot signal by first high pass filtering each quadrature signal component to remove any DC component within the signal. Then each quadrature component is squared and summed with the other squared quadrature component. Thus, in a first finger, an initial finger noise estimate 602 is provided as Pilot_Noise_I^2+Pilot_Noise_Q^2. The output of the initial finger noise estimate 602 is coupled to a first input of a multiplier 610.

A finger Pilot energy estimate 604 is made by summing the squares of the quadrature signal components (I and Q) of the Pilot signal tracked in the individual finger. Thus, for a first finger, the finger Pilot energy estimate 604 is represented by Pilot_filt_I^2+Pilot_filt_Q^2, where Pilot_filt_I and Pilot_filt_Q represent, respectively, band limited in phase and quadrature components of the Pilot signal tracked by the finger. The output of the finger Pilot energy estimate 604 is coupled to a second input of the multiplier 610. The output of the multiplier 630 is a noise power estimate in the particular finger.

The noise power estimate from the finger is coupled to a summer 630. Similarly calculated noise power estimates from other fingers 620 are coupled to corresponding inputs on the summer 630. The summer 630 adds up all the noise power estimates at its input. The output from the summer 630 is a composite noise power estimate for the signal incident on the receiver. The output of the summer 630 is coupled to a scaling block 640 where the value is scaled by a constant. The scaling block 640 may scale the noise power estimate by a fractional value to reduce the magnitude of the value that must be represented. The scaling block 640 may not be implemented in all noise power estimator 600 configurations or may be incorporated in other blocks within the estimator. Alternatively, the output from the summer 630 may not be scaled but, instead, the noise power estimator 600 implements a larger bit width to represent the larger signal at the output of the summer 630.

The output of the scaling block 640 is coupled to a filter 650 to bandlimit the noise estimate and remove any undesirable frequency components that may result from previous signal processing. The filter may be any type of filter that is suitable for the purpose. A digital filter may be preferable where the noise estimator 600 is implemented digitally. A digital filter implementation may include Infinite Impulse Response (IIR) or Finite Impulse Response (FIR) type filters. The output of the filter 650 is coupled to an accumulator 660. The accumulator 660 sums the noise power estimates over a frame as was done for the estimate in the signal energy estimator 500. The time span for the noise power estimate accumulation is chosen to coincide with the accumulation period chosen for the signal, although such tracking is not a requirement.

Figure 7:
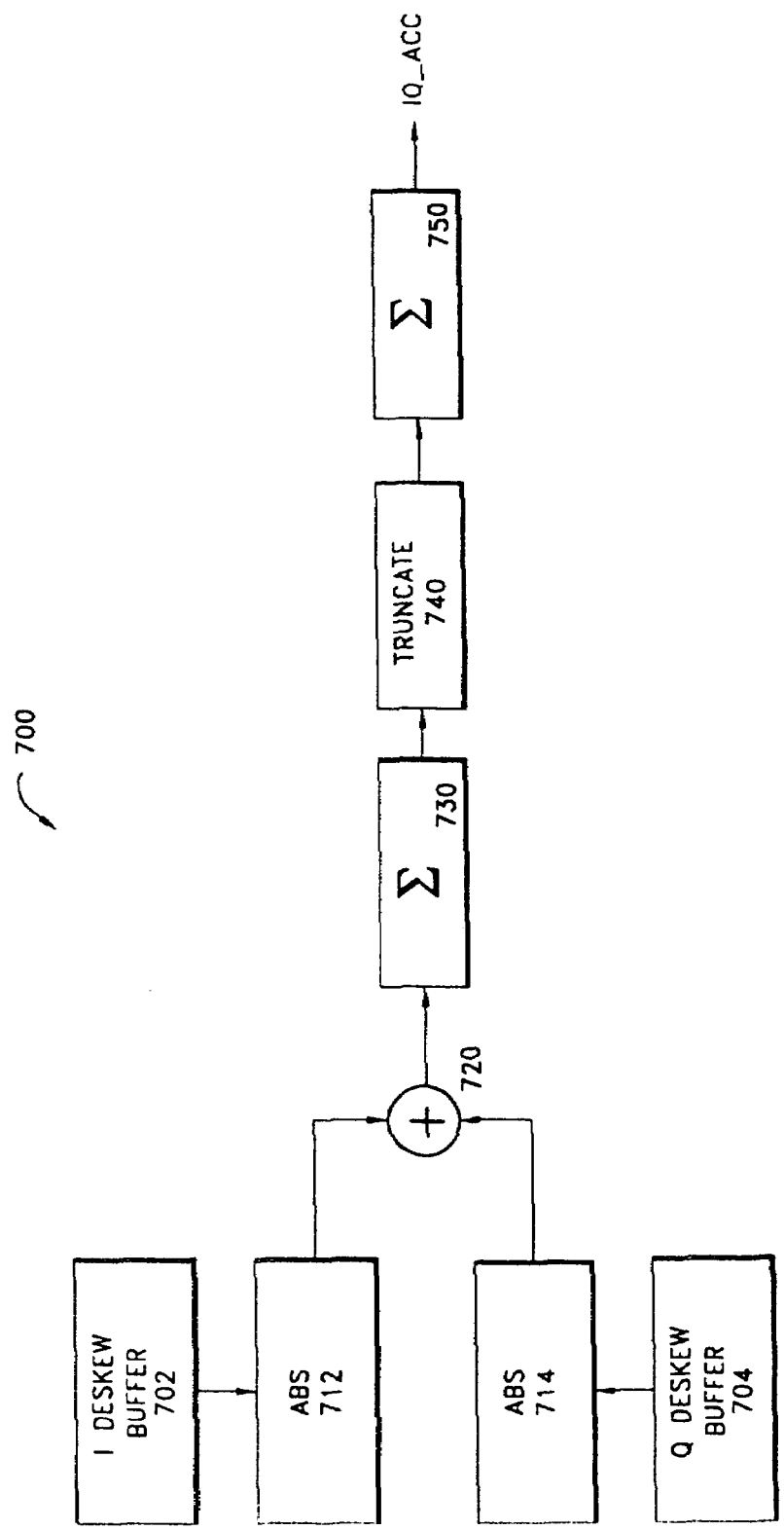
FIG. 7 is a block diagram of a Signal Energy Estimator.

FIG. 7 shows a functional block diagram of an alternative signal energy estimator 700 that may be used for channels that do not carry power control bits. As discussed earlier, the CDMA 2000 standard allows for several radio configurations. There may be many channels simultaneously operating in a Forward or Reverse Traffic channel. Channels such as the Forward Supplemental Channel (F-SCH) may not carry power control bits. Thus, the signal energy estimator 500 shown in FIG. 5 may not be the ideal implementation.

The signal energy estimator 700 shown in FIG. 7 estimates the signal energy directly from the despread symbols. A coherently combined in phase (I) signal from the I deskew buffers 702 is coupled to a first absolute value generator 712. The first absolute value generator 712 calculates the magnitude of the signal and couples that magnitude to a first input of a summer 720. Similarly, a coherently combined quadrature phase (Q) signal from corresponding Q deskew buffers 704 is coupled to an input of a second absolute value generator 714. The second absolute value generator 714 calculates the magnitude of the combined Q signal and couples that magnitude to a second input of a summer 720. The summer 720 adds the combined I and Q signals at its inputs and couples the summed output to a first accumulator 730. The first accumulator 730 accumulates the summer 720 output over a period of a single Power Control Group. The number of symbols that are accumulated in a single Power Control Group may vary according to the Walsh length used to spread the symbol at the transmitter. Spreading the symbols with a shorter Walsh length may result in a larger number of symbols per Power Control Group.

The output from the first accumulator 730 is coupled to a truncation block 740. The truncation block 740 represents an optional block that is not necessary but will likely be included in any design that has a limited amount of resources. Truncation minimizes the total number of bits representing a number, and thus, the amount of resources (e.g. bus width, register size, memory space) that are required to support the number of bits. The truncation block 740 may truncate a fixed number of bits from the input signal or may truncate a number of bits that varies depending on operating conditions within the receiver. The truncation block 740 may truncate a number of bits that varies according to the Walsh code length used to initially spread the symbols. As discussed earlier, the number of symbols in a Power Control Group may vary depending on the Walsh code length. Thus, the number of symbols that contribute to the accumulator 730 sum may also depend on the Walsh code length. If it is assumed that the symbol energy is approximately the same regardless of the Walsh code length, then the magnitude of the sum output from the accumulator 730 will be larger when a shorter Walsh code length is used. The larger magnitude results because the accumulator 730 sums a greater number of symbols over the same Power Control Group period. The truncation block 740 may then truncate a larger number of bits for a shorter Walsh code length. As an example, the truncation block 740 may truncate two bits when the Walsh code length is eight or fewer chips, one bit when the Walsh length is sixteen or thirty two, and zero bits for longer Walsh lengths.

The truncated output from the truncation block 740 is coupled to an input of a second accumulator 750. The second accumulator 750 accumulates the signal energy estimate over the period of a frame. Where a frame is composed of sixteen Power Control Groups, the second accumulator 750 sums sixteen consecutive outputs from the truncation block 740. The accumulated output is the signal energy estimate derived using the quadrature signal components of received symbols.

The signal energy estimators, 500 and 700, shown respectively in FIGS. 5 and 7 provide a signal energy estimate that is coherently combined among fingers. For example, let a signal in a first finger be modeled as $r_1 = S + n_1$ and a signal in a second finger be modeled as $r_2 = S + n_2$. Here, S represents the signal component and $n_1$ and $n_2$ represent the noise components in the respective fingers. The signal energy estimate uses a coherent combination of the two fingers. Thus, the signal energy estimate is proportional to the expected value, $E\{r_1 + r_2\}^2$, which is proportional to $4S^2$.

However, the noise estimator 600 shown in FIG. 6 does not coherently combine the noise from multiple fingers when making the noise power estimate. In particular, the I and Q noise estimates from each finger are individually squared and scaled prior to being combined with similarly calculated values from the other fingers. Non-coherent noise combination does not create any issues in the majority of situations. The noise in the multiple fingers is assumed to be uncorrelated. However, non-coherent noise combination may create problems when the signals in multiple fingers are correlated. As was discussed earlier, signals in multiple fingers of the rake receiver may be correlated under certain conditions. The noise in the fingers is correlated when the signals are correlated.

The noise power estimator 600 of FIG. 6 may underestimate the noise power when the signals in multiple fingers are correlated. Using the same signal model presented above for two fingers, the noise power estimate is proportional to Var $\{r_1\}$+Var $\{r_2\}$, where Var $\{\ \}$ represents the variance of a signal. Here, the sum of the two values gives Var $\{n_1\}$+Var $\{n_2\}$. However, where the signals in the two fingers are correlated and allowed to be identical for the purposes of illustration, a coherent sum of the noise would give as the result 4Var $\{n_1\}$.

A calculated Signal to Noise Ratio (SNR) for non-coherent noise power estimation differs from a SNR for coherent noise power estimation when signals in multiple fingers are correlated. Allowing the signals in two fingers to be identical for purposes of illustration, the signal energy estimate is proportional to $4S^2$ and the non-coherently derived noise power estimate is proportional to 2Var $\{n_1\}$. The noise power estimate derived using coherent finger combining is proportional to 4Var $\{n_1\}$. The SNR for a combination of identically correlated fingers, $SNR_{f1+f2}$, should equal the SNR for a single finger, $SNR_{f1}$. However, it can be seen that the calculated $SNR_{f1+f2}$ using non-coherent noise power estimation is $2SNR_{f1}$. The SNR is overestimated by a factor of two when there are two fingers tracking identical signals. The calculated SNR metric is thus overestimated when signals in multiple fingers are correlated. The SNR overestimation may have negative effects on closed loop power control and the corresponding received signal quality.

An alternative method of noise power estimation is to estimate the noise power directly by demodulating an empty Walsh code. Demodulating an empty Walsh code ensures that correlated noise between multiple fingers, if any, will be coherently combined. An empty Walsh code is a code for which no channel is assigned. A system may have Walsh codes for which no channels will be assigned or a Walsh channel may be chosen for which there is no channel assigned during the period of noise power estimation. The Forward Link of CDMA wireless communication systems defined by the TIA/EIA 95 and CDMA 2000 standards potentially uses all of the available Walsh codes. Thus, there are no Walsh codes for which it is guaranteed that no channels will be assigned. Temporarily empty Walsh codes could be used for the noise power estimation as long as the Walsh code is empty for the duration of the noise power calculation. However, if the receiver is implemented in a CDMA MS, the receiver is unable to know when a Walsh code will be assigned to another user. Thus, the receiver may be unable to predict that a particular Walsh code will remain empty for the entire duration of a noise power estimate.

However, a noise power estimator may take advantage of the manner in which the Pilot Channel is generated. As shown above, the Pilot Channel is modulated with no data and is not scrambled by the long PN code. Thus, although the Pilot Channel has a fixed Walsh code assignment, the Pilot Channel appears to the receiver as an empty Walsh code channel. In particular, it is the quadrature symbol component of the Pilot Channel that is an empty Walsh code channel.

Figure 8:
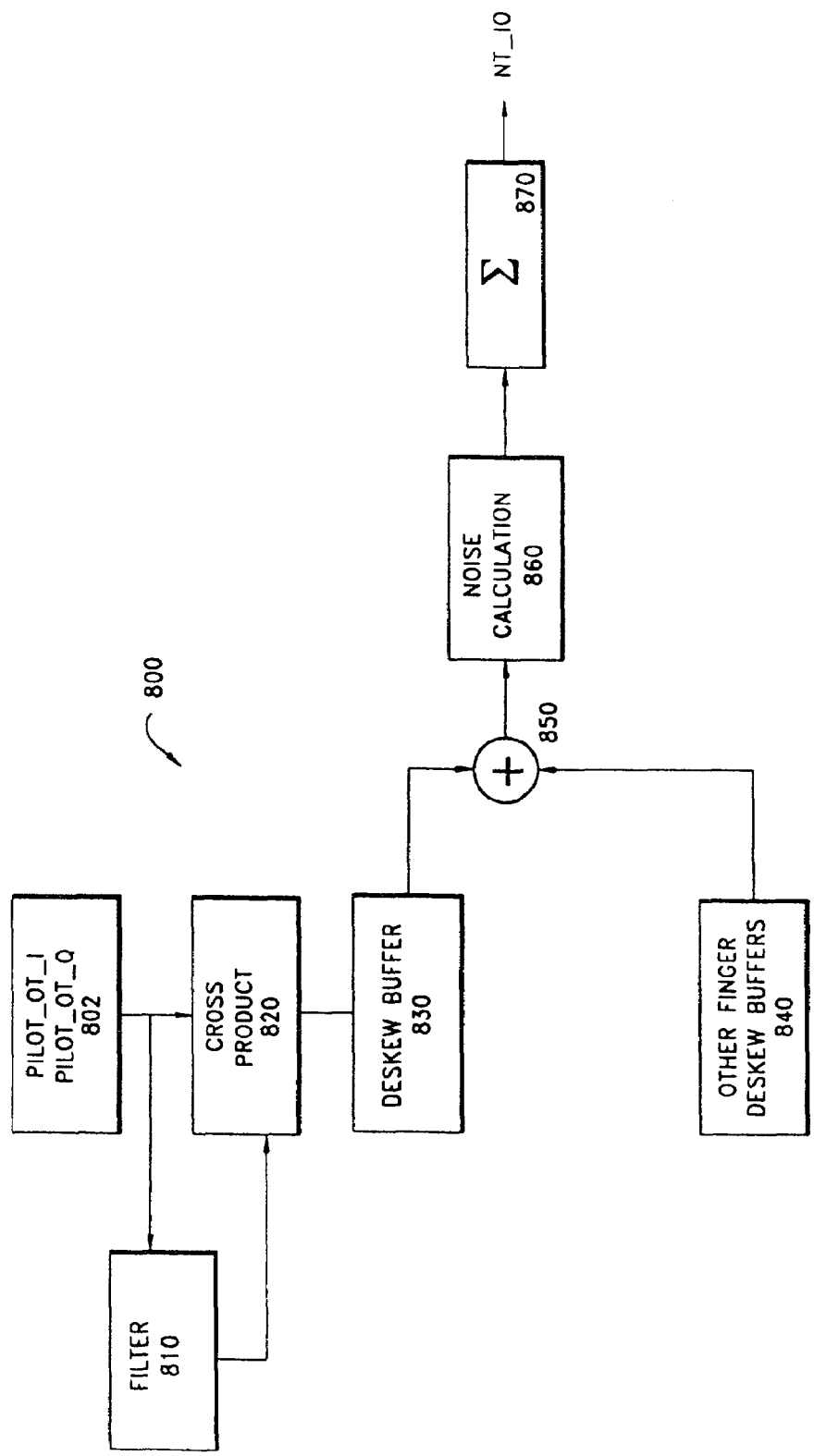
FIG. 8 is a block diagram of a Pilot Noise Power Estimator.

A functional block diagram of a noise power estimator 800 that is based on demodulating the Pilot Channel as an empty Walsh code is shown in FIG. 8. The noise power estimator 800 recovers the quadrature component of the Pilot Channel. As discussed earlier, in CDMA 2000 systems, the Pilot Channel may be generated using only in phase (I) symbols and an empty quadrature (Q) symbol component. A received pilot signal is recovered by removing the in phase and quadrature short PN codes. The recovered in phase and quadrature Pilot symbols 802 from a first finger are coupled to a first input of a cross product calculator 820. The recovered in phase and quadrature Pilot symbols 802 from the finger are also coupled to a filter 810.

The filter 810 is used to band limit the recovered Pilot signal in order to remove any undesirable frequency components such as may result from sampling. The filter 810 may be implemented as an analog or digital filter. If the noise power estimator 800 is implemented digitally it may be preferable for the filter 810 to be a digital filter such as an IIR or FIR filter. The output of the filter 810 is coupled to a second input of the cross product calculator 820.

The cross product calculator 820 calculates a cross product of the recovered Pilot and the filtered Pilot, although the result is treated as a scalar and not a vector. Thus, if the recovered Pilot is represented as $(I_{pilot}, Q_{pilot})$ and the filtered Pilot is represented as $(I_{pilot\_filt}, Q_{pilot\_filt})$ then the output of the cross product generator is $(I_{Pilot} \times Q_{Pilot\_filt} - Q_{Pilot} \times I_{Pilot\_filt})$. As discussed earlier, the result is a scalar and not a vector. The cross product result is an estimate of the noise power in the signal path tracked by the particular finger because the Pilot Channel is not modulated with any data. The cross product result is coupled to a deskew buffer 830.

The deskew buffer 830 operates in the same manner as it does when the finger was tracking a Traffic Channel. The deskew buffer 830 allows the finger to time align the received signal from the particular finger with all other fingers tracking multipath replicas of the same signal. The output from the deskew buffer 830 is coupled to a summer 850.

Other fingers in the receiver may also track the Pilot Channel. Each finger recovers corresponding quadrature Pilot signal components, generates a cross product using a filtered Pilot, and time aligns the resultant signal in a deskew buffer. The signal processing of the Pilot Channel performed by any other fingers is represented in block 840. Each of the other fingers tracking the Pilot channel couples the corresponding deskew buffer output to the summer 850.

The summer 850 operates to coherently combine all the outputs from the deskew buffers because the deskew buffers hold time aligned demodulated Pilot data. Thus, if the signal in any of the fingers is correlated, the signals will coherently combine in the summer 850. Correlated noise tracked by different fingers will thus coherently combine. The output of the summer 850 is coupled to a noise calculator 860.

The output of the summer 850 represents a combined noise power estimate derived from the Pilot Channel. As discussed above, the SNR metric calculated for closed loop power control may be incorrectly estimated when the statistics of the noise power estimate do not track the statistics of the signal energy estimate. Coherently summing the noise estimates from individual fingers contributes significantly to aligning the statistics of the noise power estimate with the statistics of the signal energy estimate. The noise calculator 860 is used to further align the statistics of the noise power estimate with statistics of signal power estimates. The processing performed by the noise calculator 860 differs depending on a calculation performed within the signal energy estimate.

In one embodiment, the noise calculator 860 calculates the square of the coherent sum. This may be viewed as calculating an energy of the demodulated Pilot noise signal. The embodiment of the noise estimator 800 that calculates the energy of the demodulated Pilot may be used when the signal energy estimate calculates a square of the demodulated signal as an energy. An example of a signal energy estimate that calculates the square of the demodulated signal is an estimator based on a re-encoded symbol energy.

In another embodiment, the noise estimator 860 calculates an absolute value of the demodulated Pilot noise signal. Calculating the absolute value may be viewed as calculating a magnitude of the signal. The embodiment of the noise estimator 800 that calculates the magnitude of the demodulated Pilot may be used when the signal energy estimate calculates an absolute value of the demodulated signal. The signal energy estimators, 500 and 700, use absolute values in the calculation of the signal energy estimate. Thus, the noise estimator 800 that uses the absolute value calculation as the noise calculator 860 may provide a noise estimate that has statistics that are closer to the statistics of the signal energy estimator. The output of the noise calculator 860 is coupled to an accumulator 870 that sums the noise estimates over a period of one frame. Thus, the noise estimator 800 is able to coherently sum the noise from multiple fingers, thereby compensating for potential signal correlation among fingers. Additionally, the noise estimator 800 calculates a noise estimate in a manner such that the statistics of the noise estimate closely track the statistics of the signal energy estimate.

Figure 9:
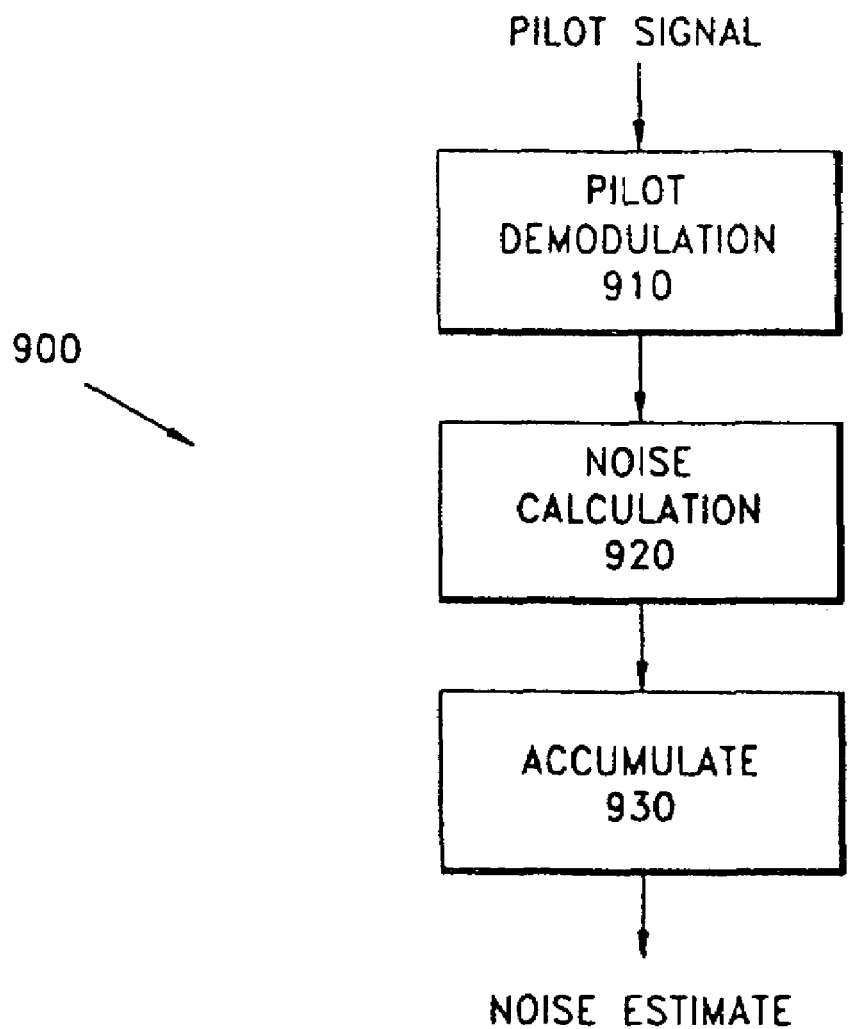
FIG. 9 is a flow chart of a noise power estimation algorithm.

FIG. 9 shows a generalized flow chart of a noise estimator 900. A received Pilot signal is provided to the noise estimator 900. In an actual implementation a composite received signal may be received from which a Pilot signal would be recovered. The signal applied to the noise estimator 900 represents a recovered Pilot signal following removal of the short PN codes. The noise estimator 900 is able to discern the Pilot Channel from all other channels due to the orthogonal nature of CDMA signals. The noise estimator 900 first performs Pilot demodulation in block 910. The noise estimator 900 treats the Pilot signal the same as a data modulated signal such that the noise estimate will have the same statistics as any signal energy estimate. Because the Pilot Channel carries no data, the demodulated signal provides an estimate of noise. Within Pilot demodulation block 910, multiple fingers may track multipath versions of the Pilot Channel and coherently combine the demodulated noise from each finger.

Once the Pilot demodulation block 910 is complete, the flow chart proceeds to block 920 where a noise calculation is performed. The noise calculation is performed such that the statistics of the noise estimate will further track the statistics of the signal energy estimate. In one embodiment the noise calculation block 920 calculates an energy of the demodulated signal by squaring the demodulated signal. In another embodiment, the noise calculation block 920 calculates a magnitude of the demodulated signal by taking the absolute value of the demodulated signal. Following the noise calculation block 920, the flow chart proceeds to an accumulator block 930 where the noise calculation is accumulated over a period of a frame. The output of the accumulator block 930 represents the noise estimate.

Figure 10:
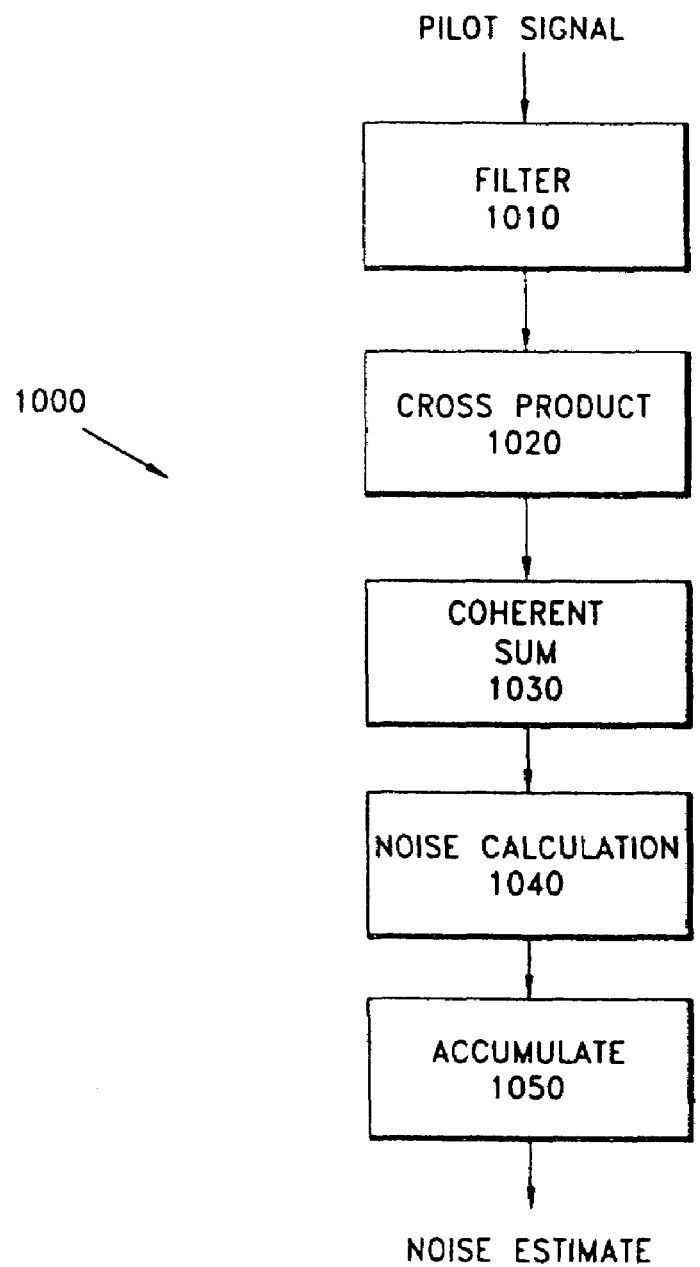
FIG. 10 is a flow chart of a noise power estimation algorithm.

FIG. 10 shows a flow chart of an alternative embodiment of a noise estimator 1000. Again, the noise estimator 1000 is provided a recovered Pilot signal. The recovered Pilot signal is the Pilot Signal that has the short PN codes removed. The noise estimator 1000 initially filters the Pilot signal in block 1010. The noise estimator 1000 additionally retains an unfiltered version of the Pilot signal. The flow chart next proceeds to block 1020 where a cross product is performed using the unfiltered Pilot and the filtered Pilot signal. The elements of the cross product are treated as if they were scalars rather than vector components. The flow chart next proceeds to block 1030 where a coherent sum of cross products from multiple fingers is calculated. The noise estimator 1000 may include multiple fingers each performing the steps of blocks 1010 and 1020 and providing the results to block 1030 for coherent summing.

The flow chart next proceeds to block 1040 where a noise calculation is performed. As was performed previously, the noise calculation is performed such that the statistics of the noise estimate will further track the statistics of the signal energy estimate. In one embodiment the noise calculation block 1040 calculates an energy of the demodulated signal by squaring the demodulated signal. In another embodiment, the noise calculation block 1040 calculates a magnitude of the demodulated signal by taking the absolute value of the demodulated signal. The flow chart next proceeds to block 1050 where the noise calculations are accumulated over a period of a frame. The output from the accumulator block 1050 represents the noise estimate.

As can be seen from the previous description and accompanying figures, a noise estimate in a CDMA receiver may be calculated in such a manner that the noise estimate takes into account possible correlation between signals in multiple fingers. Additionally, the noise estimate may be calculated in such a manner that the statistics of the noise estimate track the statistics of a signal energy estimate used in the calculation of a SNR metric for closed loop power control.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile station, base station, or base station controller. In the alternative, the processor and the storage medium may reside as discrete components in a mobile station, base station, or base station controller.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method of estimating noise power, the method comprising:
   coherently demodulating a first replica of a noise signal channel component having a first phase to generate a first demodulated replica;
   coherently demodulating a second replica of the noise signal channel component having a second phase to generate a second demodulated replica; and
   determining a noise estimate from a the first demodulated replica and the second demodulated replica.

2. A method in accordance with claim 1, wherein the noise signal channel component is an empty code channel of a quadrature phase modulated signal comprising an in-phase component and a quadrature component.

3. A method in accordance with claim 2, wherein the empty code channel is the quadrature component.

4. A method in accordance with claim 3, wherein the quadrature phase modulated signal comprises a pilot signal comprising an in phase pilot signal component comprising an in-phase symbol and a pilot signal quadrature component without a symbol.

5. A method in accordance with claim 4, wherein coherently demodulating each of the replicas of the noise signal channel component comprises calculating a cross product of the pilot signal channel components.

6. A method in accordance with claim 5, wherein calculating the cross products of the pilot signal channel components comprises:
   recovering the in-phase component;
   recovering the quadrature component;
   filtering the in-phase component and the quadrature component to produce a filtered in-phase component and a filtered quadrature component; and
   calculating a cross product of the filtered in-phase component and the filtered quadrature component with the in-phase component and quadrature component.

7. A method in accordance with claim 6, further comprising: treating the cross product as a scalar value.

8. A method in accordance with claim 7, wherein the determining the noise estimate comprises:
   coherently summing the first demodulated replica and the second demodulated replica.

9. A method in accordance with claim 8, wherein the coherently summing comprises:
   time aligning the plurality of coherently first demodulated replica and the second demodulated replica; and
   summing the time aligned replicas.

10. A method in accordance with claim 1, wherein the determining comprises:
    coherently combining the first demodulated replica and the second demodulated replica.

11. A method of estimating noise power in a spread spectrum communication system, the method comprising:
    receiving a plurality of replicas of a pilot signal to recover a plurality of in-phase symbol replicas;
    receiving a plurality of replicas of a noise signal within a quadrature component of the pilot signal to recover a plurality of quadrature symbol replicas;
    determining a noise estimate by calculating a cross product of the in-phase symbol replicas and the quadrature symbol replicas with filtered in-phase symbol replicas and quadrature symbol replicas.

12. A communication device for estimating noise power comprising:
- a rake receiver configured to generate a plurality of coherently demodulated replicas and comprising a plurality of rake fingers, each rake finger
- configured to coherently demodulate a replica of a noise signal received on a code channel to generate one of the plurality of coherently demodulated replicas; and
- a noise power estimator configured to determine a noise estimate based on a sum of the coherently demodulated replicas.

13. A communication device in accordance with claim 12, wherein each rake finger is configured to coherently demodulate an empty code channel of quadrature phase modulated signal comprising an in-phase component and a quadrature component.

14. A communication device in accordance with claim 13, wherein the empty code channel is the quadrature component.

15. A communication device in accordance with claim 14, wherein the quadrature phase modulated signal comprises a pilot signal comprising an in-phase pilot signal component comprising an in-phase symbol and a pilot signal quadrature component without a symbol.

16. A communication device in accordance with claim 15, wherein each rake finger comprises a cross product calculator configured to calculate a cross product of the pilot signal channel components.

17. A communication device in accordance with claim 16, further comprising a filter configured to filter the in-phase pilot signal component and the quadrature pilot signal component to produce a filtered in-phase component and a filtered quadrature component, the cross product calculator configured to calculate a cross product of the filtered in-phase component and the filtered quadrature component with the in-phase pilot signal component and quadrature pilot signal component.

18. A communication device in accordance with claim 17, wherein the cross product calculator is farther configured to treat the cross product as a scalar cross product value.

19. A communication device in accordance with claim 18, further comprising:
- a deskew buffer in each rake finger configured to time align the coherently demodulated replicas,
- a summer configured to coherently sum the plurality of time aligned demodulated replicas.

20. A communication device for estimating noise power comprising:
- means for coherently demodulating a first replica of a noise signal channel component having a first phase to generate a first demodulated replica;
- means for coherently demodulating a second replica of the noise signal channel component having a second phase to generate a second demodulated replica; and
- means for determining a noise estimate from the first demodulated replica and the second demodulated replica.

21. A device in accordance with claim 20, wherein the noise signal channel component is an empty code channel of a quadrature phase modulated signal comprising an in-phase component and a quadrature component.

22. A device in accordance with claim 21, wherein the empty code channel is the quadrature component.

23. A device in accordance with claim 22, wherein the quadrature phase modulated signal comprises a pilot signal comprising an in-phase pilot signal component comprising an in-phase symbol and a pilot signal quadrature component without a symbol.

24. A device in accordance with claim 23, wherein the means for coherently demodulating each of the replicas of the noise signal channel component comprises means for calculating a cross product of the pilot signal channel components.

25. A device in accordance with claim 24, wherein the means for calculating the cross products of the pilot signal channel components comprises:
- means for recovering the in-phase component;
- means for recovering the quadrature component;
- means for filtering the in-phase component and the quadrature component to produce a filtered in-phase component and a filtered quadrature component; and
- means for calculating a cross product of the filtered in-phase component and the filtered quadrature component with the in-phase component and quadrature component.

26. A device in accordance with claim 25, further comprising: means for treating the cross product as a scalar value.

27. A device in accordance with claim 26, wherein the means for determining the noise estimate comprises:
- means for coherently summing the first demodulated replica and the second demodulated replica.

28. A device in accordance with claim 27, wherein the means for coherently summing comprises:
- means for time aligning the plurality of coherently first demodulated replica and the second demodulated replica; and
- means for summing the time aligned replicas.

29. A computer program product, comprising:
- computer-readable medium storing a computer program wherein the computer program causes:
- a processor to coherently demodulate a first replica of a noise signal channel component having a first phase to generate a first demodulated replica
- the processor to coherently demodulate a second replica of the noise signal channel component having a second phase to generate a second demodulated replica; and
- the processor to determine a noise estimate from the first demodulated replica and the second demodulated replica.

30. A computer program product in accordance with claim 29, wherein the noise signal channel component is an empty code channel of a quadrature phase modulated signal comprising an in-phase component and a quadrature component.

31. A computer program product in accordance with claim 30, wherein the empty code channel is the quadrature component.

32. A computer program product in accordance with claim 31, wherein the quadrature phase modulated signal comprises a pilot signal comprising an in-phase pilot signal component comprising an in-phase in-phase symbol and a pilot signal quadrature component without a symbol.

33. A computer program product in accordance with claim 32, wherein the computer program for causing the processor to coherently demodulate each of the replicas of the noise signal channel component causes the processor to calculate a cross product of the pilot signal channel components.

34. A computer program product in accordance with claim 33, wherein the computer program for causing the processor to calculate the cross products of the pilot signal channel components causes:
- the processor to recover the in-phase in-phase component;
- the processor to recover the quadrature component;
- the processor to filter the in-phase component and the quadrature component to produce a filtered in-phase component and a filtered quadrature component; and the processor to calculate a cross product of the filtered in-phase component and the filtered quadrature component with the in-phase component and quadrature component.

35. A computer program product in accordance with claim 34, further comprising: computer program for causing the processor to treat the cross product as a scalar value.

36. A computer program product in accordance with claim 35, wherein the computer program for causing the processor to determine the noise estimate
causes the processor to coherently sum the first demodulated replica and the second demodulated replica.

37. A computer program product in accordance with claim 36, wherein the computer program for causing the processor to coherently sum causes:
the processor to time align the plurality of coherently first demodulated replica and the second demodulated replica; and
the processor to sum the time aligned replicas.

38. A communication device for estimating noise power comprising:
a rake receiver comprising a plurality of rake fingers, the rake receiver configured to coherently demodulate a first replica of a noise signal channel component having a first phase to generate a first demodulated replica, and to coherently demodulate a second replica of the noise signal channel component having a second phase to generate a second demodulated replica; and
a noise power estimator configured to determine a noise estimate from the first demodulated replica and the second demodulated replica.

39. A communication device in accordance with claim 38, wherein the noise signal channel component is an empty code channel of a quadrature phase modulated signal comprising an in-phase component and a quadrature component.

40. A communication device in accordance with claim 39, wherein the empty code channel is the quadrature component.

41. A communication device in accordance with claim 40, wherein the quadrature phase modulated signal comprises a pilot signal comprising an in-phase pilot signal component comprising an in-phase symbol and a pilot signal quadrature component without a symbol.

42. A communication device in accordance with claim 41, wherein each rake finger comprises a cross product calculator configured to calculate a cross product of the pilot signal channel components.

43. A communication device in accordance with claim 42, further comprising a filter configured to filter the in-phase pilot signal component and the quadrature pilot signal component to produce a filtered in-phase component and a filtered quadrature component, the cross product calculator configured to calculate a cross product of the filtered in-phase component and the filtered quadrature component with the in-phase pilot signal component and quadrature pilot signal component.

44. A communication device in accordance with claim 43, wherein the cross product calculator is farther configured to treat the cross product as a scalar cross product value.

45. A communication device in accordance with claim 44, further comprising:
a deskew buffer in each rake finger configured to time align the coherently demodulated replicas.
a summer configured to coherently sum the plurality of time aligned demodulated replicas.

* * * * *